June 5, 1962 R. J. HOLTON 3,037,254
FASTENING DEVICE

Filed June 1, 1960 2 Sheets-Sheet 1

INVENTOR.
ROBERT J. HOLTON
BY
Teare & Fetzer
ATTORNEYS

June 5, 1962

R. J. HOLTON 3,037,254

FASTENING DEVICE

Filed June 1, 1960

INVENTOR.
ROBERT J. HOLTON

BY

Teare & Fetzer
ATTORNEYS

United States Patent Office 3,037,254
Patented June 5, 1962

1

3,037,254
FASTENING DEVICE
Robert J. Holton, Cleveland, Ohio, assignor to Tinnerman Products, Inc., Cleveland, Ohio, a corporation of Ohio
Filed June 1, 1960, Ser. No. 33,280
12 Claims. (Cl. 24—73)

This invention relates in general to clips or fasteners for mounting moldings, trim strips, cables and other objects on a supporting part, and more particularly concerns a sealing element for use with a deformable sheet metal clip, to provide a securing and sealing fastener assembly which is mountable over a work opening in a supporting part by an operation taking place entirely from the outer or accessible side of the supporting part, and which will effectively seal the work opening against the entry of water, dust, foreign matter and the like.

Deformable clip fasteners for securing molding and the like on a supporting part in combination with a sealing portion or plug for sealing the work opening in the supporting part are known in the art. One such arrangement is disclosed in the United States patent of Robert J. Holton, No. 2,924,864, issued February 16, 1960, and another such arrangement is disclosed in the pending United States application of Robert J. Holton, Serial No. 830,926, filed July 31, 1959, now Patent No. 2,995,790, issued August 15, 1961.

The present invention provides an improved detachable sealing plug or element, as compared to those of the aforementioned patent and patent application, and one which may be readily and quickly assembled in interlocking relation with the clip proper, to form a combined securing and sealing device which may be easily assembled and secured in positive sealing relation in the work opening of the supporting part. The sealing plug or element of the invention may also be readily disassembled from the clip proper, and is of a type which may be economically manufactured using mass production methods, to provide a highly advantageous securing clip and sealing assembly.

The sealing element or plug with which the present invention is particularly concerned broadly comprises a generally hollow cap or head portion which is adapted to receive therein deformable arm portions of the clip proper, in holding relationship, for mounting the sealing element in assembled relation on the clip, and a brim or flange portion, having novel plural ridges or corrugations thereon, extending in different directions, and which is adapted to overlap the marginal edges of the work opening in the supporting part and to be compressed between the supporting part and the body of the clip proper for positively sealing the work opening in the supporting part, irrespective of any irregularities which may exist either around the work opening in the supporting part or on the body of the clip proper. The clip proper of the combined securing and sealing device may be of the general character disclosed in the aforementioned patent and the pending application, broadly comprising a sheet metal element defining a pair of arms which include shank portions that as aforementioned are receivable in the head portion of the sealing element and through the work opening, and which deform the head portion of the sealing element into positive sealing relationship, and at the same time may draw the body of the clip proper toward the supporting part to compress the brim portion of the sealing element against the confronting surface of the supporting part, and which shank portions also secure the clip in fastened position on the supporting part by the expansion of the shank portions into interlocking relation with marginal portions of the work opening.

2

Accordingly an object of the invention is to provide an improved sealing element or plug which can be readily assembled with and disassembled from an associated object securing clip, and which will effectively seal a work opening in a supporting part in which the clip and sealing element assembly is mounted, irrespective of any irregularities which may exist around the work opening or on the body portion of the clip proper.

Another object of the invention is to provide a sealing element of the latter mentioned type which is comparatively simple in nature, and which may be economically produced, being particularly adapted for mass production methods.

A further object of the invention is to provide a sealing element which is formed of relatively soft and pliable material, such as rubber, for ready detachable assembly with an associated fastening clip for effectively sealing a work opening in a supporting part on which the sealing element and clip assembly is adapted to be mounted, and which comprises a hollow dome-like head portion and a base in the form of a flange or brim portion, such flange portion embodying a plural arrangement of ridges or corrugations thereon extending circumferentially with respect to the brim portion and projecting in opposite axial directions with respect to the sealing element, such corrugations being adapted to be deformed by the clip proper into sealing relation with marginal portions of the work opening in the supporting part, upon securing of the clip to the supporting part.

Another object of the invention is to provide a combined sealing and securing assembly in the form of a sheet metal clip fastener and a deformable sealing element or plug which is readily attached to and detached from the clip proper, and wherein the combined sealing and securing assembly can be quickly and securely fastened in a work opening in a supporting part or panel with a portion of the sealing element extending through the work opening, and which possesses improved sealing characteristics against the entry of water, dust, etc. passing through the work opening in the supporting part.

Other features and advantages of the invention will be apparent from the following description taken in conjunction with the accompanying drawings wherein.

Referring now again to FIGS. 1 to 6 inclusive of the drawings, there are disclosed a sealing element or plug 10 and the combined securing clip and sealing element assembly, which is adapted to be applied in secured relation in a work opening 12 in a supporting part A, for mounting a molding M or other object on the supporting part.

Figure 1:
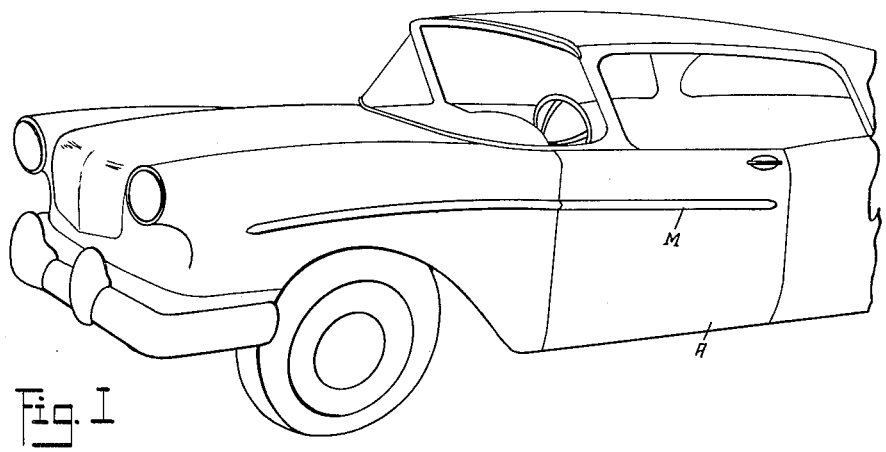
FIG. 1 is a perspective and more or less diagrammatic view illustrating one environmental setting in which the securing and sealing clip assembly of the present invention may be advantageously used, and more particularly shows an automotive vehicle having a trim strip or molding mounted on the side thereof by the fastener and sealing clip assembly of the instant invention.
Figure 2:
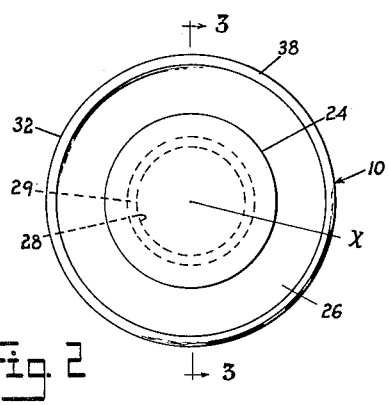
FIG. 2 is an enlarged, end elevational view of the sealing element of the invention.

The supporting part A is generally in the form of a plate or panel, or the like, as for instance the side of the automotive vehicle shown in FIG. 1, and is provided with a series of spaced openings for the required number of sheet metal clips 11 to be secured thereto along the path which the molding M is to extend when in mounted position. The panel A may be of any suitable material, such as metal, wood, plastic, fiberwood and the like, and the openings 12 therein may be round, rectangular or of any suitable outline, but are preferably provided in the manner of circular holes which involve the most inexpensive means of producing the same.

Figure 6:
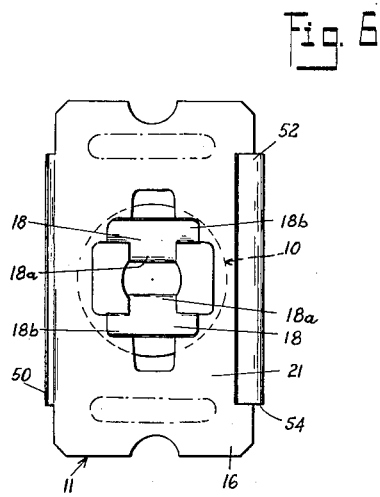
FIG. 6 is an enlarged front or outer side view of the clip and sealing element assembly of the invention, prior to securement of the latter through an apertured supporting panel.
Figure 7:
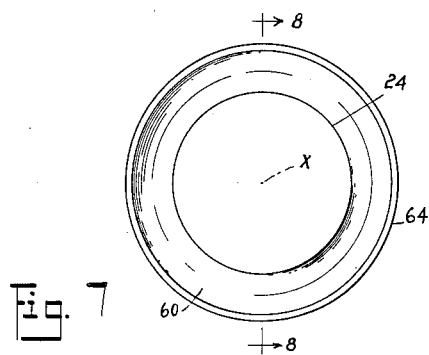
FIG. 7 is an enlarged, end elevational view generally similar to FIG. 2, but showing a modified form of the sealing element.

The clip or fastener proper 11 is preferably a simple inexpensive article of manufacture which is readily constructed from any suitable malleable-like sheet metal, such as cold rolled steel, or malleable spring metal. Such malleable-like metal possesses the characteristic that it may be permanently deformed upon predetermined application of force, as distinguished from a purely spring type metal which when bent will usually return to its original position upon removal of the bending force. The securing clip member 11 is preferably comprised of a sheet metal blank which defines the generally planar base or body 16 of the clip proper, and is provided with a partially severed area preferably in the approximate center thereof, as best seen in FIG. 6, forming a pair of movable arms 18 which in the embodiment illustrated are bendable or hingedly connected to base 16 along bend lines generally disposed intermediate opposite free ends of each of the arms, and substantially in the plane of the base. The base 16 preferably possesses a slight arcuate configuration in a transverse direction, for providing a generally tensioned engagement between the clip body and the supporting panel, when the clip and sealing device assembly is in mounted and secured relation on the panel. The general arrangement of a suitable clip proper is disclosed in the aformentioned patent, with the movable arms 18 comprising tongue or shank portions 18a joined to tab or head portions 18b. When the arms 18 are bent from the partially severed base or body 16 of the clip, as shown, the free ends of the tab element 18b project outwardly from the front or outer surface 21 of the clip base, while the free ends of the tongues or shanks project inwardly or rearwardly from the inner or under surface 23 of the clip base. The arms 18 thus are united to the fastener base 16 in a bendable connection, intermediate the ends of the arms, and in a manner whereby the tongue or shank portions 18a at the inner or under surface of the clip base are movable outwardly from each other responsive to relative inward movement of the head or tab elements 18b projecting from the forward or outer surface of the base and where they are therefore readily accessible for actuation for securing the clip or fastener in a work opening, such an operation taking place entirely from the outer side of a support panel.

Figure 4:
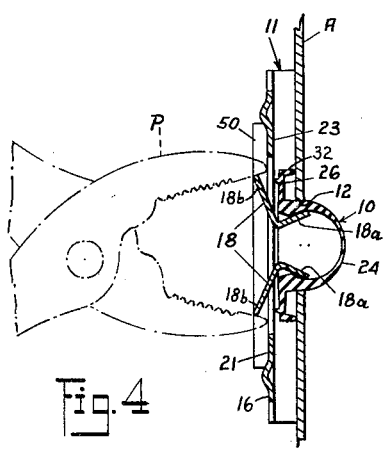
FIG. 4 is an enlarged, horizontal sectional view of the securing and sealing clip assembly of the invention in its preliminary assembled form on a supporting panel, or the like, with a tool engaging the arms of the clip proper in the procedure for attaching the assembly in secured sealing relation on the supporting panel.

Preferably, the tab elements 18b are initially provided in outwardly diverging relationship, substantially as best shown in FIGS. 4 and 6, with the shanks 18a carried thereby curved or directed initially inwardly toward one another and then outwardly away from one another, to provide a pair of cooperating shank elements in the form of outwardly extending hooks or the like, projecting from the under surface of the fastener base 16. Such shank portions are adapted to be readily received through the respective work opening 12 in the panel A when in assembled relation with a sealing plug element 10, for securing the clip to the supporting part, and for urging or deforming the sealing plug into positive sealing relationship with marginal portions of the work opening, as will be hereinafter described in greater detail.

The separable or detachable sealing element or plug 10 with which the invention is particularly concerned is preferably formed of relatively soft, pliable, plastic or rubber-like material, and comprises a generally hollow, preferably dome-shaped, head portion 24 and a base in the form of a flange or brim portion 26 which extends generally radially outwardly from the head portion. Sealing element 10 is of a configuration which readily lends itself to mass production methods thereby resulting in an inexpensive yet effective sealing element.

Figure 3:
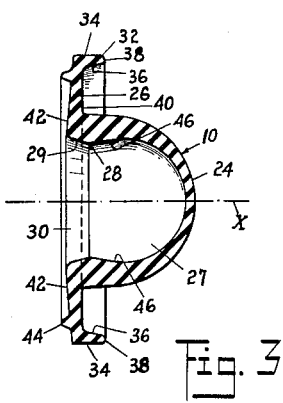
FIG. 3 is a vertical sectional view taken generally along line 3—3 of FIG. 2, looking in the direction of the arrows.

Referring in particular to FIG. 3, it will be seen that the inner surface of the plug element which defines the open cavity or pocket 27 in the plug generally converges as at 28 in a direction toward the flange or brim portion 26, and then diverges generally outwardly as at 29 to form a relatively wider entranceway 30 into the cavity 27.

Brim portion 26 is made of sufficient radial extension so as to substantially overlap the confronting marginal portions of the support panel surrounding the work opening 12 therein, while the head portion 24 of the sealing plug is preferably of a size to be readily received in relatively snug relationship in the work opening 12, and as is clearly shown in FIG. 4 of the drawings.

In accordance with the invention, the brim portion 26 of sealing element 10 is of a configuration to give greatly enhanced sealing characteristics to the clip and sealing element assembly, upon securement of the latter in a work opening in the supporting part A, irrespective of any irregularities which may occur around the work opening or on the base portion of the clip proper. Such irregularities around the work opening might be in the form of burrs or roughened metal particles around the periphery of the work opening on the outer or accessible side of the support panel A, occasioned during the formation of the work opening in the panel. Irregularities on the base 16 of the clip proper 11 might also be in the form of roughened metal particles around the partially severed area of the clip base during formation of the arm portions 18, or may be irregularities occasioned during the formation of the generally arcuate configuration, in a transverse direction, of the base of the clip. In any event, such irregularities tend to cause poor sealing of the work opening in heretofore known arrangements of sealing element and clip assemblies. The instant sealing element also gives good sealing characteristics on an arcuate or curved support panel, as is often found in the automotive environment illustrated. Accordingly, the brim 26 of the instant sealing element comprises an upstanding preformed flange or ridge 32 which extends circumferentially about the brim at the peripheral or terminal edge thereof, and which ridge projects in the general direction of extension of the head portion 24 of the sealing element. Ridge 32 is of substantial lengthwise or axial extension and in the embodiment illustrated possesses a length of approximately one-fifth of the lengthwise or axial extension of the head portion 24. It will be noted that the outer defining surface 34 of ridge 32 is circumferentially extending and disposed substantially parallel to the axis of revolution X of the sealing element, while the inner defining surface 36 of the ridge 32 is obliquely disposed, and generally diverges outwardly away from the axis of revolution X of the sealing element. Surfaces 34 and 36 merge with one another at the free end of the ridge in a generally rounded configuration 38. The top or inner surface 40 of the brim is substantially planar and is disposed in a plane extending generally perpendicular to the axis of revolution X, while the lower or outer surface 42 of the brim slopes outwardly away from passageway 30 and in the general direction of projection of head portion 24 of the sealing element. Surface 42 of the sealing element is provided with a circumferentially extending preformed ridge portion 44, integral with the brim of the sealing element, and projecting in a direction generally opposite to the direction of projection of head portion 24 of the sealing element. As can be most clearly seen from FIG. 3 of the drawings, ridge 44 is disposed inwardly of the peripheral edge of brim 26 and inwardly of ridge 32, and is of a substantially lesser lengthwise dimension as compared to that of ridge 32.

In mounting the securing and sealing clip assembly on the supporting part, a sealing plug or element 10 of the invention is first positioned over the shank portions 18a of the arms 18 of the clip proper, and then is forced downwardly into engaged relationship with the underside 23 of the body 16 of the clip. In this connection, the outwardly flared portion 29 of the sealing cap member coacts in sliding relationship with the free ends of the shank portions of the arms, and serves to cam the shank portions through the inwardly restricted passageway 30 of the sealing plug, and into cavity 27. During movement of the shank portions into the cavity 27, the material of the sealing element in the vicinity of passageway 30 may be deformed or stretched slightly, so as to permit passage of the shank portions therethrough, but once the shank portions pass the ridge 28 on the inner cavity surface of the sealing plug, the elastic memory or resiliency of the material of the sealing element causes the latter to assume its normal substantially non-deformed shape, with the sealing element being held in positive assembled position on the clip proper by the interlocking coaction between the shank portions 18a and the obliquely disposed abutment surfaces 46 on the inner surface of cavity 27, and as is shown in FIG. 4 of the drawings.

The proper number of work openings are prepared in a line running along a predetermined path in which, for instance, the molding M is to extend, and the coacting head portion 24 of the sealing element 10 and shank portions 18a of the arms 18 of the clip and sealing element assembly are fed through each of the work openings substantially as shown in FIG. 4. The size of the work opening is preferably such that the head portion 24 and shank portions 18a are readily received therethrough, with the outer surface of the dome of the sealing element just barely touching the defining surface of the work opening, and the free ends of the shank portions projecting beyond the rearward or underside of the panel A. The tabs 18b, which have free ends projecting from the front side of the assembly, are readily accessible for quick and easy actuation by a suitable tool, such as a pliers P shown in FIG. 4, to compress the tabs from their diverging relationship shown in FIG. 4 to substantially the parallel relationship shown in FIG. 5.

Figure 5:
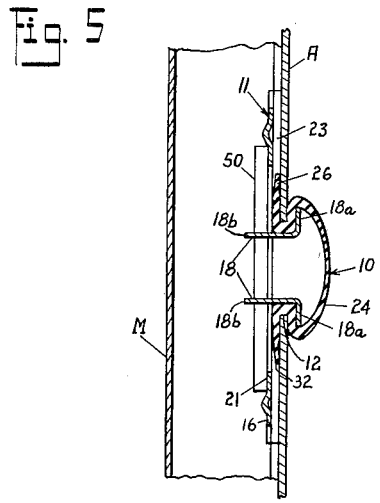
FIG. 5 is an enlarged, horizontal sectional view generally similar to FIG. 4, but illustrating the clip and sealing plug assembly in sealing position on the supporting part, and with a trim strip or molding being held in fastened position on the supporting part by the clip fastener.

Such movement of the tabs 18b toward each other causes the arms, including the shank portions 18b, to pivot about their bendable connections to base 16 in a manner whereby the shanks are forced outwardly with respect to one another and overlap the adjacent edges of the work opening 12 on the rearward or underside of the support panel A. During such movement of the shank portions 18a to generally permanently deformed positions, the head portion 24 of the sealing element may be stretched in the direction of movement of the shank portions, whereby portions of the defining wall of the head 24 are urged into overlapping relationship with marginal edge portions of the panel A around the work opening 12 and as shown in FIG. 5. As the free ends of the shank portions 18a move and urge sections of the head portion 24 of the sealing element into engaged relationship with the rearward or underside of the panel A and urge portions of the head 24 into intimate sealing relation with the periphery of the work opening, the arms also draw the body 16 of the clip proper toward and into generally tensioned engagement with the front or outer side of the support panel A, which results in compressing the brim portion 26 of the sealing element, and urging and deforming the outer ridge 32 into positive sealing engagement against the front side of the support panel. Any irregularities around the work opening due to the formation of the hole therein are compensated for by the resiliency of the material of the sealing element and by the outer peripheral ridge portion 32 which positively engages the panel around the work opening. Thus the deformable ridge 32 insures a continuous positive sealing engagement between the brim of the sealing element and the confronting surface of the panel irrespective of irregularities or the like which may occur around the work opening and on the body proper of the clip. The ridge 44 which projects from the outer surface 42 of the brim ensures that the brim and associated outer flange 32 will be urged into sealing relation with the support panel A, irrespective of any irregularities which may occur on the body proper of the clip, and in effect serves as an abutment coacting with the body of the clip proper during its tensioned movement toward the support panel. In the finalized condition of the clip and sealing element assembly shown in FIG. 5, inner ridge 44, a well as outer ridge 32 may be generally flattened into substantially coplanar relation with the brim 26 as shown. The aforementioned generally arcuate configuration of the base 16 of the clip proper provides for the tensioned engagement of the clip body with the support panel, and therefore aids in maintaining the clip in assembled position on the panel A.

The molding M is then positioned over the clips with one of the conventional inturned flanges of the molding disposed in overlapping interlocked relation with flange 50 on the clip body and with the extremity of the other conventional flange of the molding engaging the cam surface 52 on the other of the flanges 54 of the body of the clip. When downward pressure is exerted on the top of the molding M, the free end of the non-interlocked flange on the molding is sprung into interlocked relation with the flange in a manner well known to those skilled in the art, to complete the mounting of the molding M on the panel or other supporting part. This operation is in the nature of a snap fastening action which takes place as a result of the inherent resiliency of the inturned flanges on the molding.

It it becomes desirable or necessary to replace or repair the supporting panel A, as often occurs in the automotive environmental setting illustrated, the molding M may be readily snapped out of interlocking relation with the flanges on the clip body, the tabs 18b on the arms 18 then being accessible for bending away from one another, whereby the shank portions 18a are moved inwardly toward one another and out of interlocking relation with the inner or underside of the supporting panel. The securing and sealing clip assembly can then be easily withdrawn from the work opening 12. It will be seen that the clips and associated sealing elements may be used again, for reassembling the molding on a new panel, or on the same panel, or new sealing elements may be easily assembled with the clips, and then the clip and sealing element assemblies can be conveniently reassembled upon the supporting panel.

Figure 8:
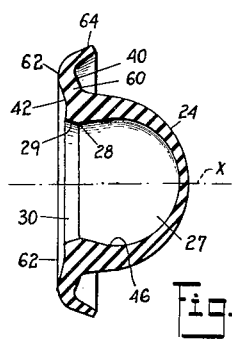
FIG. 8 is a vertical sectional view taken generally along line 8—8 of FIG. 7, looking in the direction of the arrows.

Referring now to FIGS. 7 to 10, there is shown a modification of the invention as concerns the sealing element. The sealing element of the modification is generally similar to that of the first described embodiment of the sealing element in all respects except for the configuration of the brim portion. In the modified form of the sealing element, the brim portion 60 is initially directed obliquely away from the head portion 24 of the element to provide a circumferentially extending ridge-like portion 62 projecting from the outer side surface 42 of the brim, and then is reversed to project obliquely outwardly with respect to the head portion and in the general direction of extension of the latter, to provide a peripheral ridge portion 64 of substantial lengthwise dimension projecting outwardly from inner side surface 40 of the brim, and as best shown in FIG 8 of the application drawings. This outwardly disposed ridge 64 on the brim portion 60 operates in a generally similar manner as the ridge 32 on the first described embodiment of the sealing plug and it will be seen that with such orientation, positive sealing between the marginal portions of the supporting panel adjacent the work opening therein is provided. The other ridge 62 on the brim portion, which would correspond generally to the ridge 44 on the first described embodiment, coacts with the body 16 of the clip in a generally similar manner as described for the first embodiment to provide for positive sealing of the brim portion with the supporting part irrespective of any irregularities which may exist on the body of the clip proper or adjacent the periphery of the work opening in the supporting part.

Figure 9:
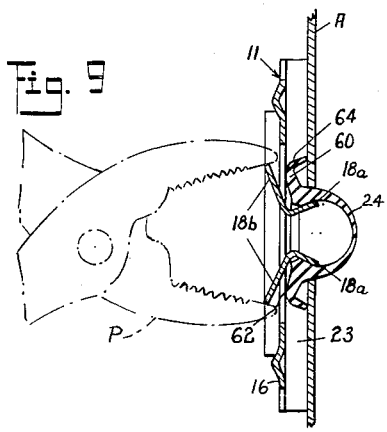
FIG. 9 is a view generally similar to that of FIG. 4, but showing the modified form of sealing element as illustrated in FIGS. 7 and 8, assembled with the sheet metal clip fastener.
Figure 10:
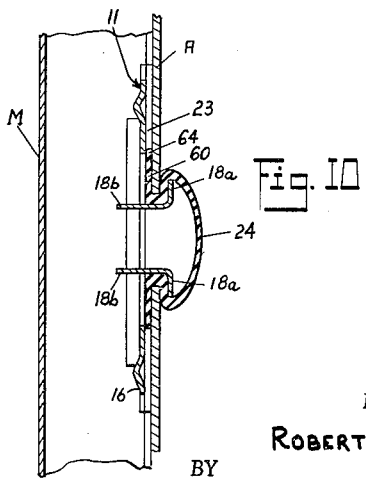
FIG. 10 is a view generally similar to that of FIG. 5, but showing the modified sealing element of FIGS. 7 and 8 as assembled with the sheet metal clip fastener, and in finalized secured and sealing position on a supporting panel.

The attachment of the modified form of sealing element to the clip proper is generally similar to the first described embodiment of the invention, and as shown in FIG. 9 of the drawings, and its sealing characteristics between the supporting part and the body of the clip proper, as shown in FIG. 10, are generally similar to the first described embodiment, to provide an effective seal of the work opening.

From the foregoing description and accompanying drawings it will be seen that the invention provides a novel, inexpensive sealing element for detachable assembly with a securing clip device for effectively sealing the work opening in a supporting part or panel against the entry therethrough of water, dust, foreign matter and the like, and wherein the sealing element comprises a novel configuration of brim portion, including ridges on opposite sides of the brim portion for insuring a positive seal between the sealing element and the confronting surface of the supporting panel, irrespective of any irregularities which may exist around the work opening in the panel or on the body proper of the clip.

The terms and expressions which have been used are terms of description and not of limitation, and there is no intention in the use of such terms and expressions of excluding any equivalents of any of the features shown and described, or portions thereof, but it is recognized that various modifications are possible within the scope of the invention claimed.

I claim:

1. A sealing element for a work opening in a part, such as a panel, and adapted for detachable assembly with an object securing clip, said sealing element being comprised of generally pliable material, such as rubber, and including a base in the form of a brim portion and a generally hollow flexible head portion extending outwardly a substantial amount from one side of said brim portion, the interior of said head portion communicating with the exterior of said element in the direction of location of said brim portion, said brim portion at its outer boundary having a preformed flexible ridge projecting outwardly from said one side thereof in the general direction of extension of said head portion, the distance of projection of said ridge being of a substantially lesser amount as compared to the distance of projection of said head portion, and said brim portion having another preformed ridge portion projecting outwardly from the other side thereof in a direction away from the general direction of extension of said head portion.

2. A sealing element in accordance with claim 1 wherein the lengthwise dimension of the first mentioned ridge is substantially greater than the corresponding dimension of the other ridge.

3. A sealing element in accordance with claim 1 wherein the first mentioned ridge has defining inner and outer side surfaces, said inner side surface being disposed obliquely with respect to said head portion and said outer side surface and converging toward the latter in the direction of extension of said head portion.

4. A sealing element comprised of generally resilient pliable material, such as rubber, and including a base in the form of a circular brim portion and a dome-shaped flexible head portion extending symmetrically outwardly a substantial amount from one side of said brim portion, said head portion having a pocket therein communicating with the exterior of said element in the direction of location of said brim portion, said brim portion having a circumferentially extending preformed flexible ridge projecting outwardly from said one side thereof in the general direction of extension of said head portion, said ridge being disposed at the periphery of said brim portion, the distance of projection of said ridge being of a substantially lesser amount as compared to the distance of projection of said head portion, said brim portion having another circumferentially extending ridge projecting outwardly therefrom from the other side thereof in a direction generally away from the direction of extension of said head portion, said other ridge being disposed inwardly of the peripheral boundary of said brim portion.

5. A deformable sealing element for a work opening in a part, such as a panel, and adapted for detachable assembly with an object securing sheet metal clip of the type which includes a body portion having a generally planar surface theron and a pair of spaced movable shank elements projecting from said surface of the body portion, said sealing element being comprised of pliable material, such as rubber, and including a base in the form of a continuous circular brim portion and a generally centrally disposed flexible dome shaped hollow head portion projecting symmetrically a substantial amount from one side of said brim portion, said brim portion having an outer terminal edge which is disposed in outwardly spaced relation to the external configuration of said head portion, said head portion defining a cavity therein, said base having a passageway extending therethrough to a juncture with said cavity to provide communication between the latter and the exterior of said sealing element, said cavity being adapted to receive the shank elements of the clip therein for mounting said sealing element on the clip, means in said cavity adapted for interlocking coaction with the shanks of the clip for detachably maintaining said sealing element in assembled relation with the clip, and said brim portion at said terminal edge thereof having a continuous circumferentially extending flexible ridge projecting outwardly from said one side thereof in the general direction of extension of said head portion, the distance of projection of said ridge being of a substantially lesser amount as compared to the distance of projection of said head portion, said brim portion on the other side thereof having a continuous circumferentially extending ridge projecting outwardly therefrom in the general direction away from the direction of extension of said head portion, said other ridge being disposed inwardly of said terminal edge of said brim portion and being of a lesser lengthwise dimension than that of the first mentioned ridge.

6. A deformable sealing element in accordance with claim 5 wherein the first mentioned ridge is defined by a circumferentially extending outer side surface disposed substantially parallel to the axis of revolution of said head portion and by a circumferentially extending inner side surface which is disposed obliquely in outwardly divergent relation with respect to said axis of revolution and in the direction of extension of said head portion.

7. A deformable sealing element in accordance with claim 5 wherein the first mentioned ridge is defined by outer and inner side surfaces disposed obliquely with respect to the axis of revolution of said head portion and diverging outwardly with respect to the latter in its direction of extension.

8. A deformable sealing element in accordance with claim 5 wherein the lengthwise dimension of the first mentioned ridge is approximately one-fifth the distance between said one side of said brim portion and the free outer end of said head portion.

9. A deformable sealing element for a work opening in a part, such as a panel, and adapted for detachable assembly with an object securing sheet metal clip of the type which includes a body portion having a generally planar surface thereon and a pair of spaced movable shank elements projecting from said surface of the body portion, said sealing element being comprised of pliable material, such as rubber, and including a base in the form of a continuous circular brim portion and a generally centrally disposed dome shaped hollow flexible head portion projecting symmetrically a substantial amount from one side of said brim portion, said brim portion having an outer terminal edge which is disposed in outwardly spaced relation to the external configuration of said head portion, said hollow head portion defining a cavity therein, said base having a passageway extending therethrough to a juncture with said cavity to provide communication between the latter and the exterior of said sealing element, said cavity being adapted to receive the shank elements of the clip therein for mounting said sealing element on the clip, and having means therein adapted for interlocking coaction with the shank elements of the clip for detachably retaining said sealing element in assembled relation with the clip, said brim portion at said terminal edge having a circumferentially extending continuous flexible integral ridge projecting outwardly from said one side thereof in the general direction of extension of said head portion, said ridge having a lengthwise dimension of approximately one-fifth the distance between said one side of said brim portion and the free outer end of said head portion, said brim portion on the other side thereof having a circumferentially extending continuous integral ridge projecting outwardly therefrom in a direction generally away from the direction of projection of said head portion, the defining surface of said one side of said brim portion being disposed in a horizontal plane disposed substantially perpendicular to the axis of revolution of said head portion, the defining surface of the said other side of said brim portion tapering outwardly in a generally radial direction toward said terminal edge of said brim portion, the first mentioned ridge being adapted for abutting sealing engagement with the supporting part, the other ridge being adapted for abutting relation with the body portion of the clip.

10. In a fastening assembly comprising a supporting part, such as a panel, having a work opening therethrough, an object securing sheet metal clip mounted on said supporting part over said work opening, said clip comprising a generally planar body and a pair of spaced movable shanks projecting from said body, and a deformable sealing element comprised of generally pliable, resilient material, such as rubber, detachably mounted on said clip, said sealing element comprising a base in the form of a brim portion and generally hollow flexible head portion projecting a substantial amount outwardly from one side of said brim portion, the interior of said head portion communicating with the exterior of said element by a passageway passing through said brim portion, said shanks extending through said passageway into said head portion, said head portion and associated shanks extending through said work opening, said brim portion at its outer boundary having a preformed flexible ridge initially projecting outwardly from said one side thereof in the general direction of projection of said head portion, the initial distance of projection of said ridge being of a substantially lesser amount as compared to the initial distance of projection of said head portion, said brim portion on the other side thereof having another preformed ridge portion initially projecting outwardly therefrom in a general direction away from the direction of projection of said head portion, said brim portion being disposed in overlapping relation to the periphery of said work opening, said shanks being moved outwardly with respect to one another to generally permanently deformed positions and in secured relation in the work opening, said shanks upon said movement thereof drawing said body of said clip against said other ridge to force said brim portion against said supporting part and deform the first mentioned ridge into continuous sealing relation against the confronting surface of the supporting part, thereby insuring positive sealing of the work opening against the passage therethrough of foreign matter, irrespective of any irregularities that may occur around the periphery of the work opening and on said body of said clip.

11. In a fastening assembly comprising a supporting part, such as a panel, having a work opening therethrough, a malleable-like sheet metal clip mounted on said supporting part over said work opening and comprising a generally planar body and a pair of spaced movable arms integrally connected to said body intermediate the ends of said arms and substantially in the plane of said body, said arms defining a pair of tabs projecting from one surface of said body and a pair of shank elements projecting from the opposite surface of said body, and a deformable sealing element comprised of generally pliable, resilient material, such as rubber, detachably mounted in interlocking relation on said clip, said sealing element comprising a base in the form of a continuous brim portion disposed intermediate said body and the outer side of said supporting part and a generally hollow flexible head portion projecting a substantial amount from one side of said brim portion and extending through said work opening, said brim portion having an outer defining edge disposed in overlapping relation to the periphery of said work opening, said brim portion having a circumferentially extending preformed flexible ridge adjacent said terminal edge of said brim portion and initially projecting away from said one side of said brim portion in the general direction of projection of said head portion, the initial distance of projection of said ridge being of a substantially lesser amount as compared to the initial distance of projection of said head portion, said brim portion having another preformed ridge on the other side of said brim portion and initially projecting in a general direction away from the direction of projection of said head portion, the initial distance of projection of said other ridge being of a lesser amount as compared to the initial distance of projection of said first mentioned ridge, said head portion defining a cavity therein, said base having a passageway therethrough providing communication from said cavity to the exterior of said sealing element, said shank elements extending into said cavity and being moved outwardly to generally permanently deformed positions and in secured relation in the work opening in response to inward movement of said tabs to generally permanently deformed positions to secure the clip and sealing element assembly in said work opening, said shank elements upon said movement thereof drawing said body of said clip against said other ridge on said brim portion to force said brim portion against said outer side of said supporting part and deform the first mentioned ridge into continuous sealing relation with said outer side of said supporting part, to thereby insure positive sealing of said work opening against the passage therethrough of foreign matter, irrespective of any irregularities that may exist around the periphery of said work opening and on said body of said clip.

12. A deformable sealing element for a work opening in a part, such as a panel, and adapted for detachable assembly with an object securing sheet metal clip of the type which includes a body portion having a generally planar surface thereon and a pair of spaced movable shank elements projecting from said surface of the body portion, said sealing element being comprised of pliable material, such as rubber, and including a base in the form of a continuous circular brim portion and a generally centrally disposed hollow flexible head portion projecting symmetrically a substantial amount from one side of said brim portion, said brim portion having an outer terminal edge which is disposed in outwardly spaced relation to the external configuration of said head portion, said head portion defining a cavity therein, and said base having a passageway extending therethrough to a junction with said cavity to provide communication between the latter and the exterior of said sealing element, said cavity being adapted to receive the shank elements of the clip therein for mounting said sealing element on the clip and having means therein adapted for interlocking coaction with the shank elements of the clip for detachably retaining said sealing element in assembled relation with the clip, said brim portion at said terminal edge having a circumferentially extending continuous flexible integral preformed ridge projecting outwardly from said one side thereof in the general direction of extension of said head portion, the distance of projection of said ridge being of a substantially lesser amount as compared to the distance of projection of said head portion, said brim portion on the other side thereof defining a circumferentially extending continuous integral preformed ridge projecting outwardly therefrom in a direction generally away from the direction of projection of said head portion, said last mentioned ridge being disposed inwardly of the outermost extremity of the first mentioned ridge, and being of a lesser lengthwise dimension as compared to the lengthwise dimension of the first mentioned ridge, said first mentioned ridge having defining inner and outer side surfaces disposed obliquely with respect to the axis of revolution of said head portion and diverging outwardly with respect to said head portion in the direction of projection of the head portion.

References Cited in the file of this patent

UNITED STATES PATENTS

| | | |
|---|---|---|
| 2,586,502 | Backus | Feb. 19, 1952 |
| 2,630,237 | Rosenlof | Mar. 3, 1953 |
| 2,696,318 | Kihm | Dec. 7, 1954 |
| 2,924,864 | Holton | Feb. 16, 1960 |

FOREIGN PATENTS

| | | |
|---|---|---|
| 1,056,050 | France | Oct. 21, 1953 |